United States Patent [19]

Wuerker et al.

[11] 4,050,035

[45] Sept. 20, 1977

[54] SELF-ALIGNED POLARIZED LASER

[75] Inventors: Ralph F. Wuerker, Palos Verdes Estates; Lee O. Heflinger, Torrance, both of Calif.

[73] Assignee: TRW Inc., Redondo Beach, Calif.

[21] Appl. No.: 657,794

[22] Filed: Feb. 13, 1976

[51] Int. Cl.² ............................................. H01S 3/081
[52] U.S. Cl. ................................................. 331/94.5 C
[58] Field of Search ........................................ 331/94.5

[56] References Cited

U.S. PATENT DOCUMENTS

| 3,327,243 | 6/1963 | Stickley | 331/94.5 |
| 3,397,024 | 8/1968 | Boyden et al. | 331/94.5 |
| 3,936,768 | 2/1976 | Ichinose et al. | 331/94.5 |

OTHER PUBLICATIONS

Karube et al., Alignment Characteristics of an Optical Maser with a Corner Prism, Japanese J. Appl. Phys., vol. 6, No. 3 (Mar. 1967), pp. 364–374.
Karube et al., Alignment Characteristics of a Roof Prism Optical Maser, Japanese J. Appl. Phys., vol. 5 (1966) pp. 257–258.
Hillenkamp, A Prism for Laser Resonators which Preserves the State and Plane of Polarization, J. Appl. Phys., vol. 38, No. 11, (Oct. 1967), pp. 4545–4546.

Primary Examiner—William L. Sikes
Attorney, Agent, or Firm—Daniel T. Anderson; Edwin A. Oser; Jerry A. Dinardo

[57] ABSTRACT

A laser of the type which generates linearly polarized light and including optical means for self-alignment. Among such polarized lasers are, for example, solid state lasers and particularly ruby lasers, as well as various gas lasers employing Brewster windows. The problem is solved by utilizing a corner reflector in the laser cavity which generates two parallel laser beams. In order to achieve effective laser operation the polarization determining aspect of the laser, that is the crystal axis or Brewster windows, must be so oriented with respect to the corner reflector that the laser beam in passing through the laser is so reflected by the corner reflector that the light will return through the laserable material with the same directon of polarization as that of the original laser beam generated by the laser.

3 Claims, 2 Drawing Figures

SELF-ALIGNED POLARIZED LASER

The invention herein described was made in the course of or under a contract or subcontract thereunder, with the Department of the Air Force.

BACKGROUND OF THE INVENTION

This invention relates generally to lasers of the type generating linearly polarized light and particularly relates to a polarized laser which is self-aligned.

It is well known that lasers have to be precisely aligned for their proper operation. If the output reflector of the laser becomes misaligned the cavity loss may increase to the point that the laser system is no longer capable of lasing. For example, a ruby laser is generally aligned with an auto collimator disposed in the cavity. The collimator may be permanently included in the laser or may be temporarily inserted. The alignment of the output reflector accomplished by means of the auto collimator must be checked once a day or even more frequently in many cases. Great rigidity and alignment precision is also required of those gas lasers utilizing Brewster windows and which, of course, generate linearly polarized light.

The patent to Kantorski et al. U.S. Pat. No. 3,670,263 relates to a laser structure which is self-aligning due to its particular mechanical construction. This patent explains in some detail the problems due to misalignment of a laser.

In accordance with the present invention as indicated above, a corner reflector is utilized. Such a corner reflector may either be a transparent tetrahydral structure or it may consist of three relfectors disposed normal or at right angles to each other. A corner reflector takes its name from the fact that it may be visualized as the corner of a cube.

Two angular directions are required to specify the direction of a light beam, say, for example, altitude and azimuth. A corner reflector returns a beam exactly along the direction of its incidence to the corner reflector. Its direction of propagation is reversed but the two direction angles are unchanged. Alternately these same retro reflections may be described by saying that both angular propagation directions are increased by 180°.

In contrast to the corner reflector, the roof reflector does not return a beam with both direction angles unchanged. By proper choice of a coordinate system, the roof reflector may be seen to return the beam with one angle unchanged but the other angle will be changed unless it was rigourously perpendicular to the roof angle. The net consequence of this for the present application is that the corner reflector returns the incoming beam exactly in the same direction it was incident independent of the angular orientation of the corner reflector. The return from the roof reflector on the other hand changes the return beam angle relative to the input beam as the roof reflector is moved.

It should be noted that to completely describe the return of a light ray not only its propagation direction angles need to be defined but also its translational position. For the corner reflector a ray entering at one side of the assembly is returned from the other side (from the point symmetric with respect to the corner vertex), the direction of the ray being as described above. Thus the ray returns in the same angular direction but offset to one side.

Among patents showing a roof reflector in connection with the laser, reference is made to the patent to Stickley U.S. Pat. No. 3,327,243, the patent to Miller U.S. Pat. No. 3,414,835 and to Woodbury et al. U.S. Pat. No. 3,464,026.

It has also been proposed to provide a corner reflector in connection with a laser. However, the patent to Boyden et al. U.S. Pat. No. 3,397,024 shows a corner reflector outside of the laser cavity.

In accordance with the patent to Eckberg U.S. Pat. No. 3,447,098, a corner reflector is used to reflect the laser beam from one face of a gas laser, the beam from the other face being reflected by a refractor or mirror. However, the operation of this laser is not entirely clear. No mention is made of the fact that the corner reflector will generate two parallel laser beams. In addition, a helium-neon laser must be of rather small diameter in order to lase. In other words, the diameter of the tube cannot exceed 2 or 3 millimeters because the wall effect is essential to the lasing operation. No consideration has been given in this patent to the importance of the direction of polarization.

Finally, the patent to Bullinger U.S. Pat. No. 3,617,926 discloses a gas laser having an optical resonator cavity formed by three reflective means. One of these is a corner reflector, while the other two reflectors will reflect the two parallel laser beams. The light generated by the gas laser is polarized due to the two Brewster windows. Two additional Brewster windows are associated with the corner reflector for a purpose which is not made evident. Unless the corner reflector is carefully aligned or oriented with respect to the plane of polarization of the light generated by the laser, the device will not properly function. Thus, if the corner reflector is a transparent solid body, it will modify the polarization so that the Brewster windows will not work as planned. If the corner reflector consists of three metallic mirrors disposed at right angles to each other in an attempt to achieve a return polarization the same as the incident polarization, it will generate too much loss for a helium-neon laser.

It is accordingly an object of the present invention to provide a self-aligned polarized laser which is capable of withstanding a substantial amount of misalignment without ceasing to lase.

A further object of the present invention is to provide a laser which generates linearly polarized light and which includes a corner reflector where careful consideration is given to the direction of polarization of the light which is returned by the corner reflector.

SUMMARY OF THE INVENTION

In accordance with the present invention there is provided a self-aligned laser of the type generating linearly polarized light. This may either consist of a solid state laser which by proper orientation of the crystal axes generates linearly polarized light or else a gas laser which becomes polarized by the provision of Brewster windows. The laser includes a laserable material and means for optically exciting the material such as a flash lamp in the case of a solid state laser or a suitable electric potential in the case of a gas laser.

Means is associated with the laserable material for generating a first laser beam which is linearly polarized in a predetermined direction. This may either be the proper orientation say of a ruby rod or the proper orientation of the Brewster windows of a gas laser.

In accordance with the present invention a corner reflector is disposed in the path of the first laser beam for returning the laser beam substantially parallel to the first laser beam to provide a second laser beam. Hence the corner reflector forms part of the optical resonant cavity of the laser.

Finally reflector means is disposed in the path of both of the laser beams which are parallel to each other. The reflector means defines an optical cavity and is so arranged that it permits one of the laser beams to partially pass, providing the laser's output.

Finally, in accordance with the present invention, the laserable material and the corner reflector are so aligned or oriented and adjusted with respect to each other that the second laser beam when reflected by the reflecting means and the corner reflector will return through the laserable material with the same direction of polarization as the first laser beam. If this is not done the light becomes elliptically polarized due to a second undesirable vector of polarization which is the electric vector. This in turn will decrease the gain of the laser and not permit it to lase anymore, or at best to operate with much reduced efficiency.

The novel features that are considered characteristic of this invention are set forth with particularlity in the appended claims. The invention itself, however, both as to its organization and method of operation, as well as additional objects and advantages thereof, will best be understood from the following description when read in connection with the accompanying drawing.

Figure 1:
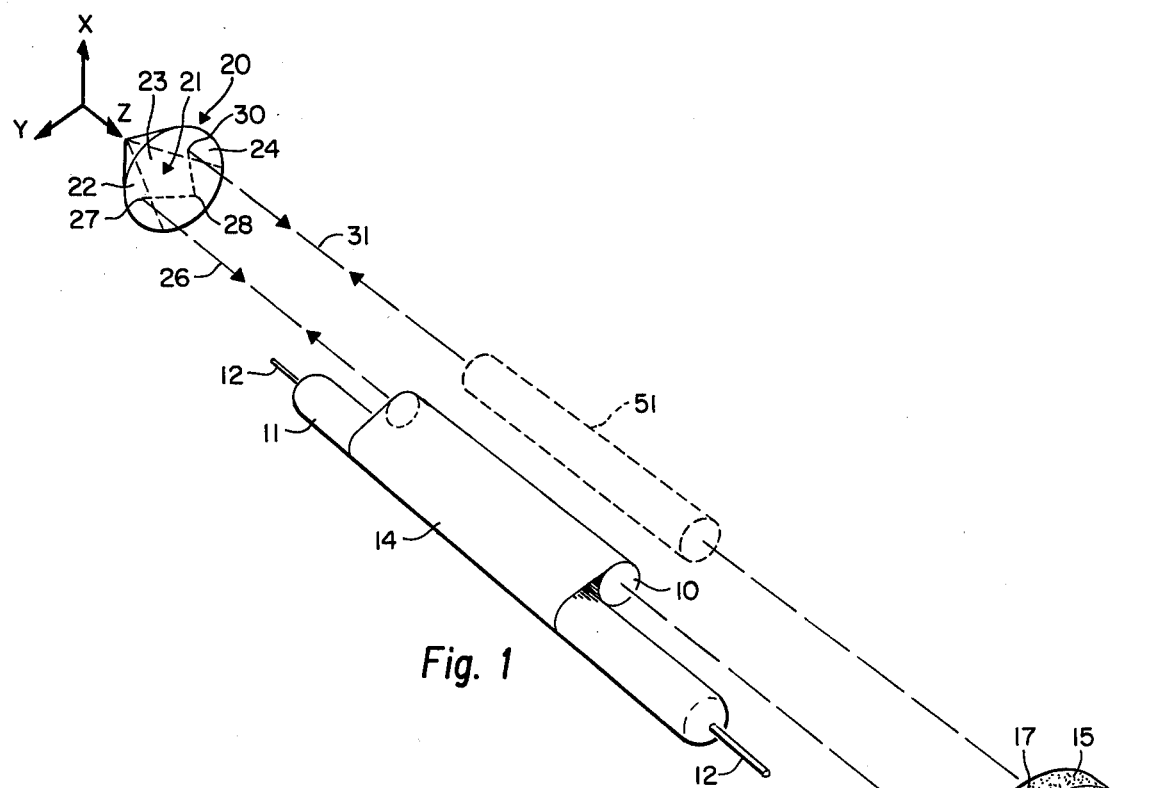
FIG. 1 is a schematic view in perspective of a solid state laser embodying the present invention.

Referring now to the drawing and particularly to FIG. 1, there is illustrated by way of example a ruby laser embodying the present invention. However, as explained hereinbefore, the invention is applicable to any laser generating linearly polarized light. This includes solid state lasers such as a ruby laser as well as gas lasers provided with Brewster windows.

The laser of FIG. 1 includes a ruby rod 10 which is pumped or excited by a flash lamp 11. The flash lamp 11 is energized by means of its electrodes 12 by a proper source not shown. A lamp reflector 14 surrounds both the flash lamp 11 and the ruby rod 10 to subject the ruby rod to an intense pumping light.

The optical resonant cavity of the laser is formed by one or two reflectors 15 and 16. The reflectors 15 and 16 may be a unitary structure or may consist of two separate portions as indicated by the dividing line 17. In any case, the reflectors 15 and 16 may be dielectric mirrors having a suitable dielectric coating. One of the reflectors may have substantially 100% reflectivity, while the other one may have a reflectivity on the order of 75% to pass a single laser beam. Alternatively, both reflectors could be arranged to pass some of the laser light to obtain two output beams.

Figure 2:
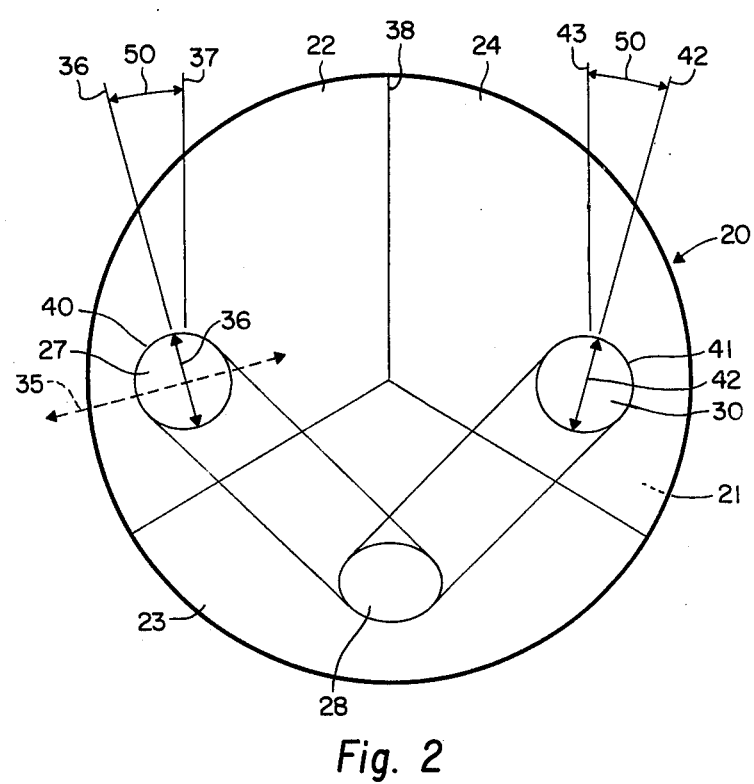
FIG. 2 is an enlarged elevational view of a corner reflector forming a part of the laser of FIG. 1 and for describing the direction of polarization of a light beam and its change as it is reflected by the corner reflector.

The laser cavity is folded about itself by means of a corner reflector 20 which is illustrated in more detail in FIG. 2 to which reference will be subsequently made. A corner reflector takes its name from the fact that it may be visualized as a cube with a corner cut off.

Hence the resulting structure is a tetrahedral. It has a flat surface 21, usually with its edge ground to a circular outline to facilitate mounting, which faces the ruby rod 10. In the back, that is to the left of the plane of FIG. 1, there are provided three planes 22, 23 and 24 disposed at right angles to each other.

Also shown in FIG. 1 is a three-dimensional coordinate system having three axes X, Y and Z. The X axis may indicate the direction of polarization of the laser. The light will propagate parallel to the Z axis. In accordance with the present invention the corner reflector is oriented or aligned by rotating it about the Z axis. This is the orientation with which the present invention is concerned. This in turn has the great advantage that rotation of the reflector 20 about either the X or Y axis does not misalign the laser.

Hence the ruby rod 10 when excited will generate a first laser beam 26 which passes through the flat surface 21 at the region 27. It is then reflected from the face 22 of the corner reflector by total internal reflection at the region directly below 27. The laser beam then passes to the region 28 of surface 23 where it is again totally internally reflected. It then proceeds to surface 21 where it is totally internally reflected for the third time in the region below 30. The laser beam then passes again through the flat surface 21 at the region 30 to provide the second laser beam 31. It will be noted that the two laser beams 26 and 31 are parallel to each other and originally move in opposite directions. However, since the reflectors 15 and 16 will at least reflect some, if not all, of the light the two laser beams 36 and 31 will move in opposite directions.

As a result, unless the corner reflector 20 and the crystalline axes of the ruby rod 10 are properly aligned, the direction of the electric vector will rotate and hence the laser beam 26 when returning through the ruby laser 10 will become elliptically polarized. As explained before, this will reduce the gain of the laser until eventually it ceases to lase.

In accordance with the present invention it has been found that it is possible to make sure that the laser beam 26 returning through the ruby rod 10 is linearly polarized in the same direction as is the original laser beam. This can be explained in more detail in connection with FIG. 2. The direction of the axis of the ruby crystal is shown at 35. As a result the direction of polarization of the laser beam 26 is normal to the axis 35 as shown at 36. This axis forms a certain angle with an axis 37 which is parallel to the edge 38 between the faces 22 and 24 of the corner reflector. These are the two faces upon which the laser beam impinges normal to the paper plane and from which it returns in the opposite direction normal to the paper plane. The incoming beam is illustrated at 40 and the outgoing beam at 41. Now, however, the direction of polarization has been rotated and is shown by the arrow 42 which again forms an angle with the axis 43 which is also parallel to the edge 38.

This angle 50 between the directions 36 and 37 or 42 and 43 is approximately 15°. However, the angle 50 depends on the material of the corner reflector which may be made of different kinds of glass having different indices of refraction or of quartz or the like. This angle can be computed by standard textbook methods; it may more readily be determined experimentally. Hence, the direction of polarization is rotated through twice the angle as will be readily seen by an inspection of FIG. 2.

However, the important point is that the laser beam 26 returning through the ruby rod 10 will now have exactly the same plane of polarization or direction of polarization as does the original laser beam.

One method of obtaining this result is to rotate the ruby rod so its output polarization makes the required angle 50 with the defining edge 38 of the corner reflector. In practice this is often inconvenient because it is frequently desired to have the laser's polarization direction either vertical or horizontal. In this event the proper alignment is achieved by rotating the corner reflector about the axis Z perpendicular to the plane of FIG. 2, so that the defining edge makes the proper angle 50 with the polarization direction of the laser. This rotation is preferably performed about the ruby beam 27, in which case the output beam 41 may become somewhat displaced. This displacement may require a similar rotation of the reflector 15, 16 in order to insure that the entire beam is unobstructed.

It should be pointed out that the proper alignment of angle 50 to achieve the proper polarization performance is not so sensitive as to require special measures for its maintenance. Thus in any resonable structure once this angle is set it will remain in adequate alignment for the life of the laser. This fact together with the fundamental corner reflector property of returning a beam in the direction of incidence guarantees permanent alignment of the laser when reflectors 15 and 16 are either integral or are so constrained as to be rigid with respect to each other.

The face 21 of the corner reflector which faces the ruby rod 10 preferably is coated with an antireflection coating. This will minimize undesirable reflections from that face. It will also be understood that the corner reflector 20 instead of being a solid body of transparent material may consist of three reflectors positioned in the planes of the faces 22, 23 and 24. In other words, the three reflectors should form right angles with each other.

As explained before, one or two output beams 46 and 47 may be obtained depending upon whether one or both of the output reflectors 15 and 16 are partially transparent. If the output reflectors 15 and 16 consist of separate portions they should be rigidly connected to each other to avoid misalignment. It is also feasible that one of the reflectors may be a plane parallel reflector, while the other is a spherical reflector.

It may be desirable to misalign the ruby rod 10 with respect to the output reflectors 15, 16 say by one degree or less. The purpose of this is to avoid that light reflected from the end faces of the ruby rod 10 interferes with the lasing action.

It has been found that the ruby laser as shown in FIG. 1 begins to lase at an energy of the flash lamp of 140 joules. At an energy of the flash lamp of 225 joules the energy of the two output beams 26 and 31 was 70 millijoules. The light output dropped by a factor of 2 when the output reflector 15, 16 was misaligned relative to the corner reflector 20 by 1¼°.

In contrast a conventional laser configuration of the same length and size would drop its output by a factor of two with angular changes of the output reflector of about 0.01 degree. Thus the new arrangement is about 100 times less sensitive with respect to alignment errors as conventional lasers.

It is also feasible to provide a second laser 51 in the path of the laser beam 31 as shown in dotted lines. In this case the second laser 51 should again be so aligned that the laser beam generated by the laser 51 when reflected by the reflector 15 and the corner reflector 20 will return through the laser 51 with the same direction of polarization as the laser beam generated thereby.

There has thus been disclosed a self-aligned laser of the type generating linearly polarized light. This is accomplished by the provision of a corner reflector in the optical resonant cavity. The corner reflector folds the laser cavity about itself. It is aligned with respect to the laserable material or the means which polarizes the laser light in such a manner that when the light is returned through the laserable material by the output reflectors and the corner reflector it has the same direction of polarization as did the light generated thereby. It is feasible to dispose a second laser in the second beam. This in turn will increase the gain of the laser or shorten the length of the cavity. A ruby laser in accordance with the invention has been found to lase in spite of a substantial misalignment of the output reflector system.

What is claimed is:

1. A self aligned laser of the type generating linearly polarized light, said laser comprising:
   a. a laserable material;
   b. means for optically exciting said laserable material;
   c. means associated with said laserable material for generating a first laser beam which is linearly polarized in a predetermined direction;
   d. a transparent corner reflector having a flat surface and three planes disposed at an angle to each other to form a tetrahedral structure, said structure being disposed in the path of said first laser beam, said first laser beam passing through said flat surface and then impinging on a first one of said planes of said corner reflector away from the apex thereof, said first laser beam being returned substantially parallel thereto to provide a second laser beam, said second laser beam being reflected on a plane adjacent said first plane and then from the third plane, whereupon said second laser beam issues from said flat surface; and
   e. reflector means disposed in the path of said first and second laser beams for reflecting said laser beams, for defining an optical cavity and for permitting a portion of at least one of said laser beams to pass, said laserable material and said corner reflector being so aligned and adjusted with respect to each other that said second laser beam when reflected by said reflector means and said corner reflector will return through said laserable material with the same direction of polarization as said first laser beam generated by said laserable material.

2. A laser as defined in claim 1 wherein a second laserable material is disposed in said second laser beam, means for optically exciting said second laserable material, and means associated with said second laserable material for linearly polarizing the light generated by said second laserable material, said second laserable material being so disposed with respect to said corner reflector that the laser beam generated by said second laserable material when reflected by said reflector means and said corner reflector will return through said second laserable material with the same direction of polarization as the laser beam generated thereby.

3. A self-aligned ruby laser comprising:
   a. a ruby rod;
   b. means for optically exciting said ruby rod;
   c. said ruby rod having a crystalline axis determining the polarization of a first laser beam generated thereby, said crystalline axis being disposed in a predetermined direction;

d. a transparent corner reflector having a flat surface and three planes disposed at an angle to each other to form a tetrahedral structure, said structure being disposed in the path of said first laser beam, said first laser beam passing through said flat surface and then impinging on a first one of said planes of said corner reflector away from the apex thereof, said first laser beam being returned substantially parallel thereto to provide a second laser beam, said second laser beam being reflected on a plane adjacent said first plane and then from the third plane, whereupon said second laser beam issues from said flat surface; and e. reflector means disposed in the path of both of said laser beams for reflecting them, said reflector means defining an optical cavity and permitting a portion of at least one of said laser beams to pass, the crystalline axis of said ruby rod and said corner reflector being so disposed with respect to each other that said second laser beam when reflected by said reflector means and said corner reflector will return through said ruby rod with the same direction of polarization as said first laser beam generated thereby.

* * * * *